(12) United States Patent
Wisniowski et al.

(10) Patent No.: US 11,455,763 B2
(45) Date of Patent: Sep. 27, 2022

(54) BOUNDING BOX GENERATION FOR OBJECT DETECTION

(71) Applicant: GM Cruise Holdings LLC, San Francisco, CA (US)

(72) Inventors: Matthias Wisniowski, Vienna (AT); Radu Dondera, Oakland, CA (US); Bin Ma, Bellevue, WA (US); Siddharth Raina, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 16/748,236

(22) Filed: Jan. 21, 2020

(65) Prior Publication Data

US 2021/0225051 A1  Jul. 22, 2021

(51) Int. Cl.
*G06T 11/60* (2006.01)

(52) U.S. Cl.
CPC .......... *G06T 11/60* (2013.01); *G06T 2210/12* (2013.01)

(58) Field of Classification Search
CPC ............................ G06T 11/60; G06T 2210/12
USPC ......................................................... 345/622
See application file for complete search history.

(56) References Cited

U.S. PATENT DOCUMENTS 10,157,331 B1 * 12/2018 Tang ..................... G06V 20/00
2018/0373980 A1   12/2018 Huval
2019/0271559 A1 *  9/2019 Colgate .............. G01C 21/3667
2019/0294970 A1    9/2019 Fidler et al.
2019/0325605 A1   10/2019 Ye et al.
2019/0347501 A1   11/2019 Kim et al.
2019/0347806 A1 * 11/2019 Vajapey .................. G06T 7/246
2019/0354857 A1   11/2019 Sallee et al.
2020/0019799 A1 *  1/2020 Shen .................. G06K 9/00671
2020/0160070 A1    5/2020 Sholingar et al.
2020/0306980 A1   10/2020 Choi et al.
2020/0311956 A1 * 10/2020 Choi ..................... B25J 9/1697

OTHER PUBLICATIONS

Boguchwal A., "3D Point Cloud Annotation 1.0," retrieved from https://www.youtube.com/watch?v=5Czvy061N7w, published Dec. 2, 2018, 7:46 minutes, 1 page.

* cited by examiner

*Primary Examiner* — Jacinta M Crawford (74) *Attorney, Agent, or Firm* — Polsinelli, PC (57) ABSTRACT

The subject disclosure relates to techniques for inserting of bounding boxes around image objects. A process of the disclosed technology can include steps for receiving, from a first data set, an image comprising a first image object, processing the image to identify a pixel region associated with the first image object, and placing a first bounding box around the first image object based on the identified pixel region. In some aspects, the process further includes steps for receiving a user input comprising an indication of whether the first bounding box is accurately placed around the first image object. Systems and machine-readable media are also provided.

18 Claims, 9 Drawing Sheets

BOUNDING BOX GENERATION FOR OBJECT DETECTION

BACKGROUND

1. Technical Field

The subject technology provides solutions for facilitating the placement of bounding boxes around image objects and in particular, for using machine-learning models to provide bounding box placement recommendations.

2. Introduction

Image processing systems that are configured to perform object recognition often use bounding boxes to identify image regions corresponding with locations of objects of interest. In some conventional image processing applications, bounding box placement is performed manually. In these conventional workflows, users are typically responsible for identifying object locations, and for drawing bounding boxes around the object edges (pixel region) using a cursor or other input device.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Due to the manual nature of conventional bounding box placement techniques, the processing of large numbers of image frames can be time consuming and expensive. For example, user-based bounding box placement can be particularly onerous when processing video feeds in which moving objects occupy different locations across frames.

Aspects of the disclosed technology address the limitations of conventional bounding box placement techniques by automatically providing bounding box recommendations for one or more objects in an image frame. Attributes of the recommended bounding boxes (e.g., placement location and dimensions) can then be verified or modified by a user. For example, in instances where the bounding box size and placement are correct, the user may confirm placement with a simple input acknowledgement, such as the pressing of a key, or a using a pointing device, such as a computer mouse. In instances where bounding box attributes need modification, the user can provide modifications, such as changes to bounding box placement and/or dimensions, while avoiding the work of drawing the box. In both scenarios, the process of correctly placing bounding boxes around objects across different image frames is greatly improved, thereby improving the efficiency of processing large numbers of image frames for image processing applications, such as object detection.

In other aspects, the foregoing limitations of conventional bounding box placement are addressed by solutions that use centroid indications to facilitate bounding box placement suggestions. In such implementations, a user provided input can indicate an approximate centroid location of an object around which a bounding box is to be placed. Using the centroid input, a machine-learning model can be used to predict bounding box placement of objects across one or more image frames.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 1:
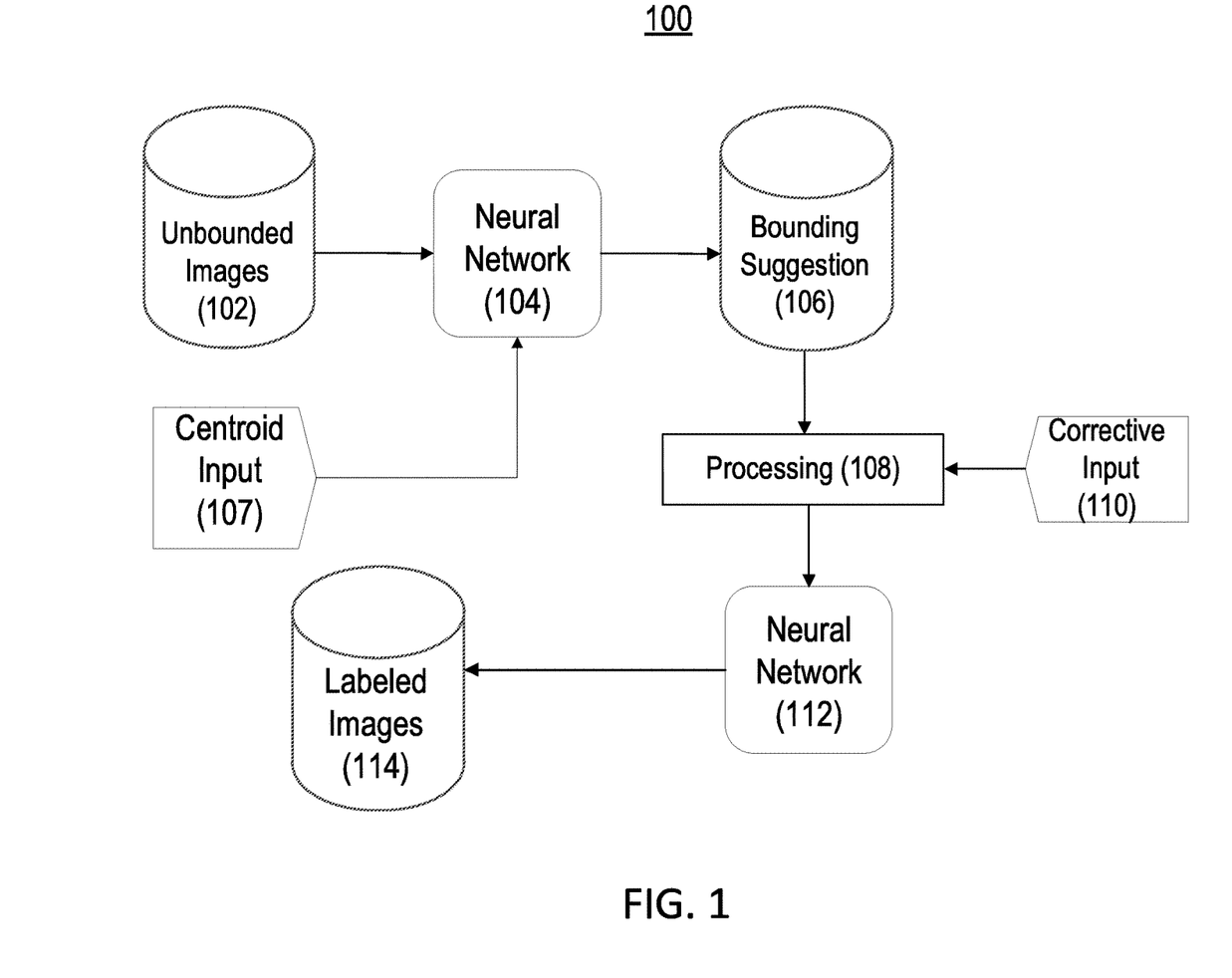
FIG. 1 illustrates an example system that can be used to facilitate bounding box insertion into one or more images, according to some aspects of the disclosed technology.

FIG. 1 illustrates an example system 100 that can be used to facilitate bounding box insertion into one or more images, according to some aspects of the disclosed technology. System 100 includes a repository of unbounded images 102 from which unprocessed (unbounded) images are provided to a neural network 104. Neural network 104 can be configured to receive unbounded images and identify image objects therein. Identification of image objects can include the identification of pixel regions corresponding with various image objects. Neural network 104 can then predict the placement of bounding boxes in relation to one or more image objects, and output bounding box suggestions that are stored to a repository of images containing bounding suggestions, e.g., repository 106.

In some instances, the initial bounding box placements performed by neural network 104 may be accurate. In such instances, acceptance of the inserted bounding box can be indicated with a simple user input, such as the click of a mouse, or pressing of an input key. Alternatively, bounding box placement may require adjusting/editing at processing step 108. As such, corrective inputs 110 can be used to further process the bounded images at processing step 108. By way of example, user (corrective) inputs can be provided to modify the size and/or location of one or more bounding boxes, for example, using a mouse pointer or other input device.

In some implementations, the processed bounding boxes are provided to additional neural-networks 112 or other machine-learning models, for example, to perform semantic classification and labeling for one or more objects in the bounding box areas. In turn, the resulting labeled and bounded objects can be stored to a repository of labeled images 114, for example, for further use by an autonomous vehicle (AV) maneuver stack.

In some aspects, user centroid inputs can also be provided in conjunction with unbounded images as inputs to neural network 104. For example, neural network 104 can be configured to receive an unbounded image from repository 102 together with user inputs that indicate an approximate center (centroid) location of at least one image object in the unbounded image. In some aspects, centroid location information provided by the user can increase accuracy of bounding box insertion in the unbounded images. Similar to the examples provided above, even in instances where user centroid inputs are used to produce initial bounding box insertions/recommendations, later user inputs can still be used to correct or adjust bounding box location and/or sizing. Examples of the foregoing embodiments are discussed in relation to graphical examples provided by FIGS. 2-5, discussed below.

Figure 2:
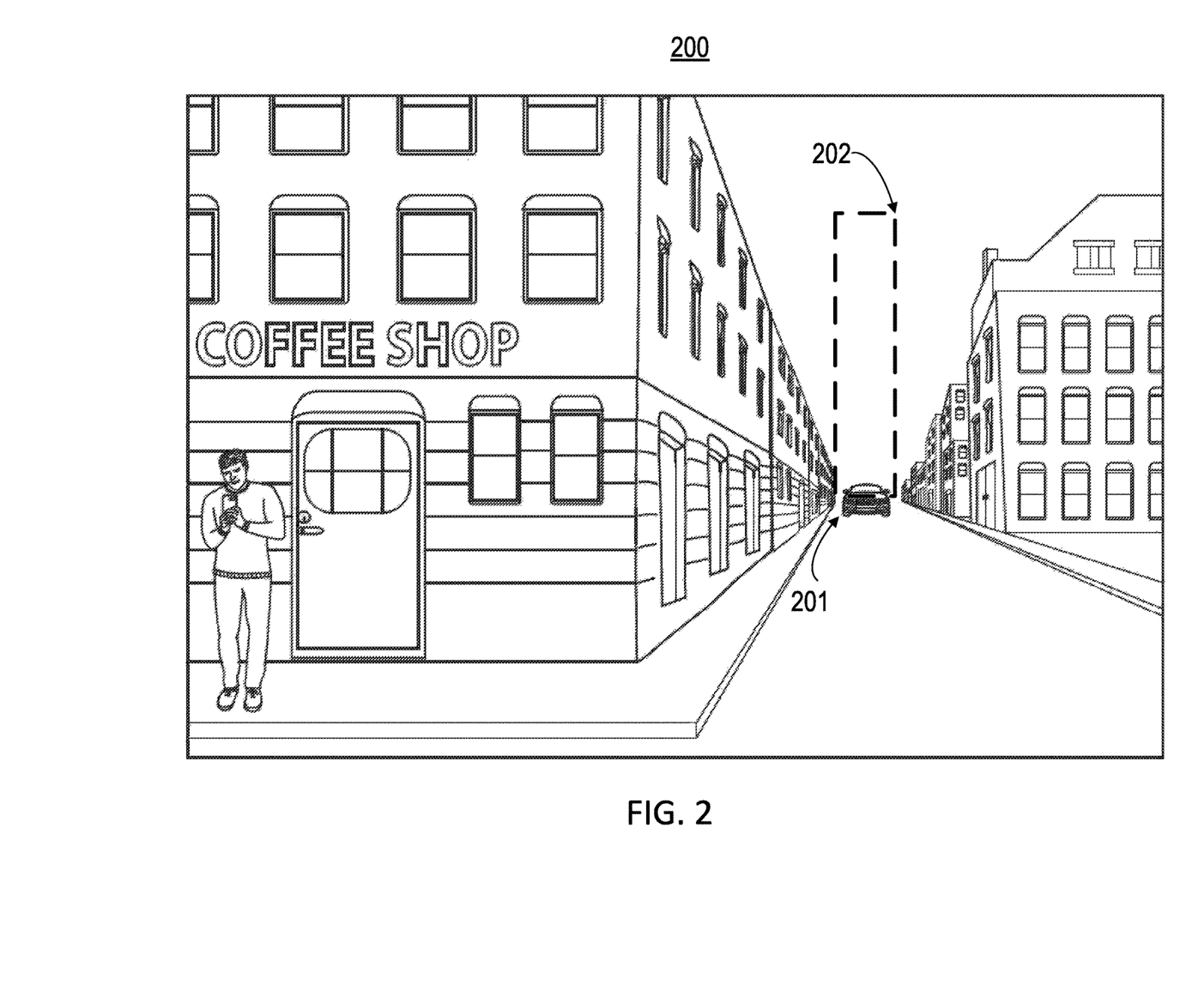
FIG. 2 illustrates an example of an initial bounding box placement performed using a placement process of the disclosed technology.

FIG. 2 graphically illustrates initial placement of a bounding box 202A performed using a process of the disclosed technology. In the example of FIG. 2, image 200 can represent an initial output of a bounding box process performed by a neural network. In this example, image object 201 is detected (e.g., using machine-learning techniques), and bounding box 202 is inserted into image 200, encompassing a pixel area of image object 201.

Figure 3:
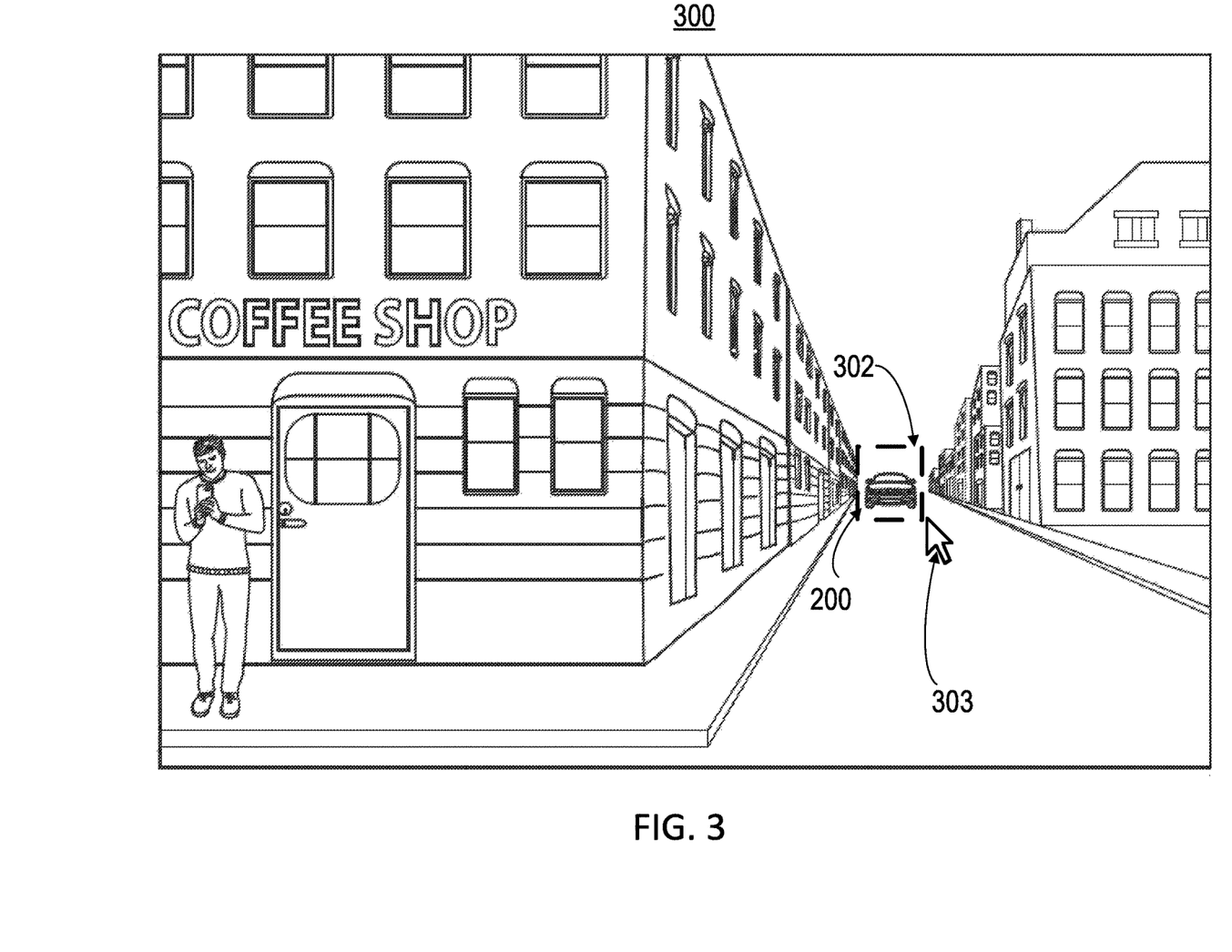
FIG. 3 illustrates an example of a bounding box correction performed based on user input, according to some aspects of the disclosed technology.

FIG. 3 illustrates an example of a bounding box correction performed on image 300, based on provided user input. In particular, image 300 illustrates an example in which bounding box 200 (FIG. 2) is edited via a user input provided via cursor 303, to produce bounding box 302. In this example, bounding box 302 more accurately encompasses a pixel region corresponding with image object 200. It is understood that a similar bounding box processing methodology can be applied to one or more other image objects in the same image set. Additionally, as discussed above, additional processing steps can be performed to identify semantic labels that are associated with the image object. In the example provided by images 200, 300, the semantic label "car" may be associated with image object 200 that is encompassed by bounding box 302.

It is additionally understood that user inputs may be received using virtually any computer-connected input device. For example, user acknowledgement of bounding box placements can be indicated using cursor or keyboard-based inputs, touch-screen inputs, and/or audible inputs and the like.

Figure 4:
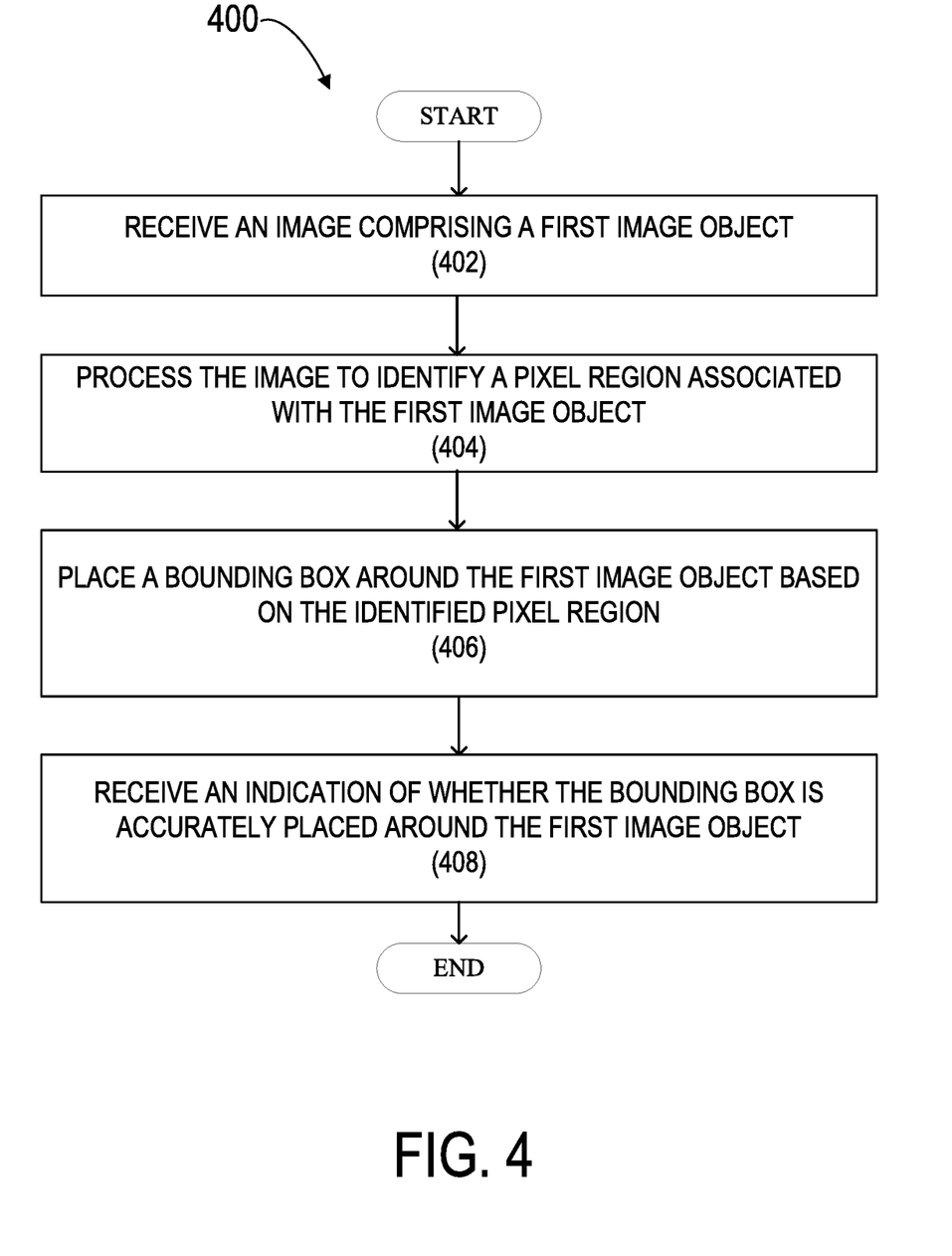
FIG. 4 illustrates steps of an example process for facilitating bounding box insertion onto one or more image objects, according to some aspects of the disclosed technology.

FIG. 4 illustrates steps of an example process 400 for facilitating bounding box insertion onto one or more image objects, according to some aspects of the disclosed technology. Process 400 begins with step 402 in which an image is received (e.g., by a machine-learning model). As discussed above, the image may be an unprocessed image that contains one or more unbounded image objects.

In step 404, the image is processed (e.g., by a machine-learning model) to identify a pixel region associated with at least one image object contained in the image. Subsequently, in step 406, a bounding box is placed around the first image object based on the identified pixel region. By way of example, the bounding box can represent an initial estimation of a bounding box size and location that is needed to closely encompass the image object.

In step 408, an indication of whether the bounding box is accurately placed around the first image object is received. As discussed above, the indication can be a user input that provides verification that the initial bounding box placement was accurate. By way of example, a user provided cursor click or other minimal validation indication may be received. By automatically placing the bounding box and committing the bounding box to the image in response to a received user acknowledgement, the foregoing workflow greatly improves the process of adding bounding box indicators to image objects across multiple images.

In instances wherein the initial bounding box is incorrectly placed, or of an incorrect size, then the received indication can include user input to correct the position and/or dimension of the bounding box. In a similar manner, this workflow provides an improvement over conventional bounding box processing techniques, wherein a user must manually identify image objects and generate corresponding bounding boxes for each image object instance.

Figure 5:
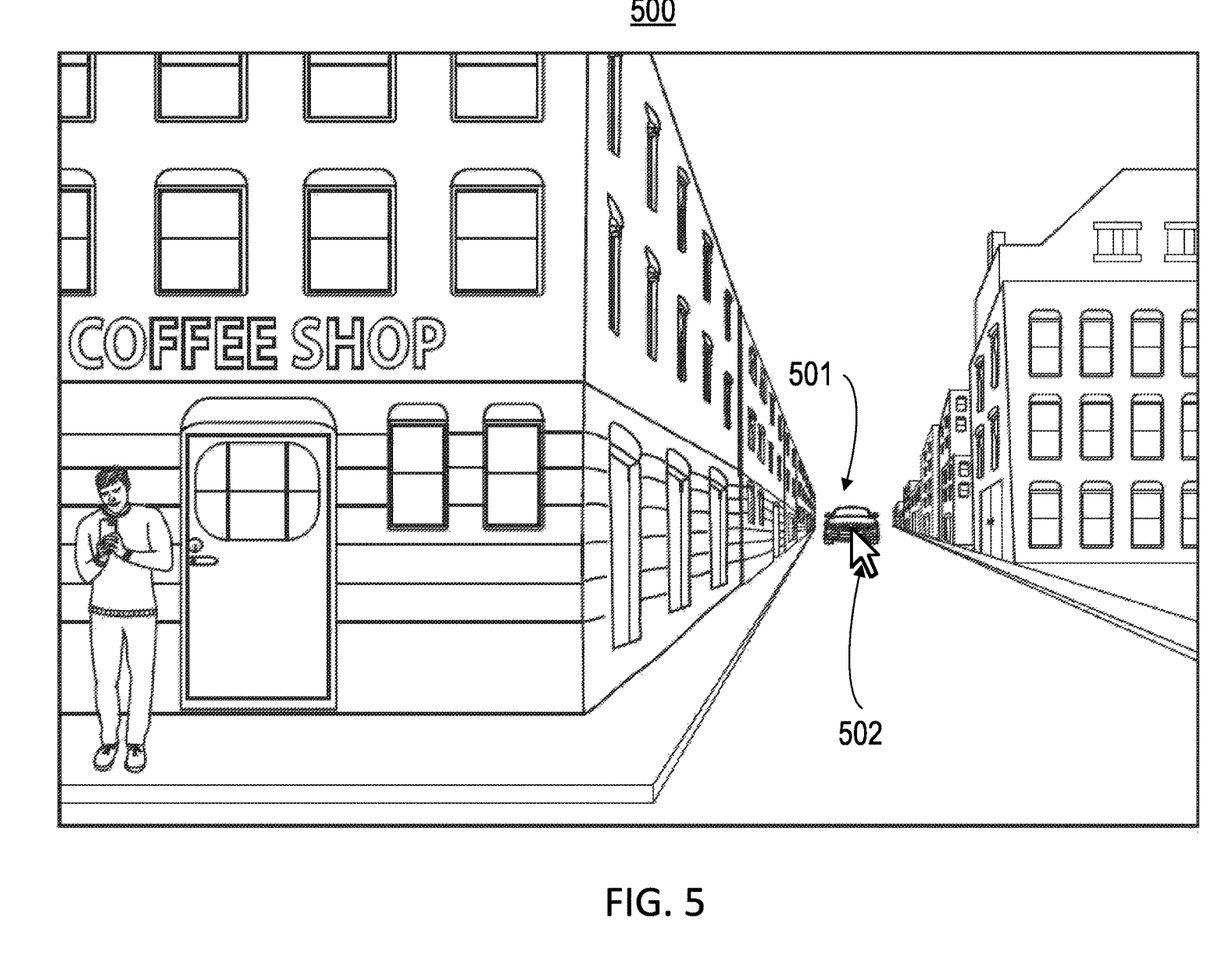
FIGS. 5-6 illustrate examples of a bounding box placement method that uses image object centroid information, according to some aspects of the disclosed technology.
Figure 6:
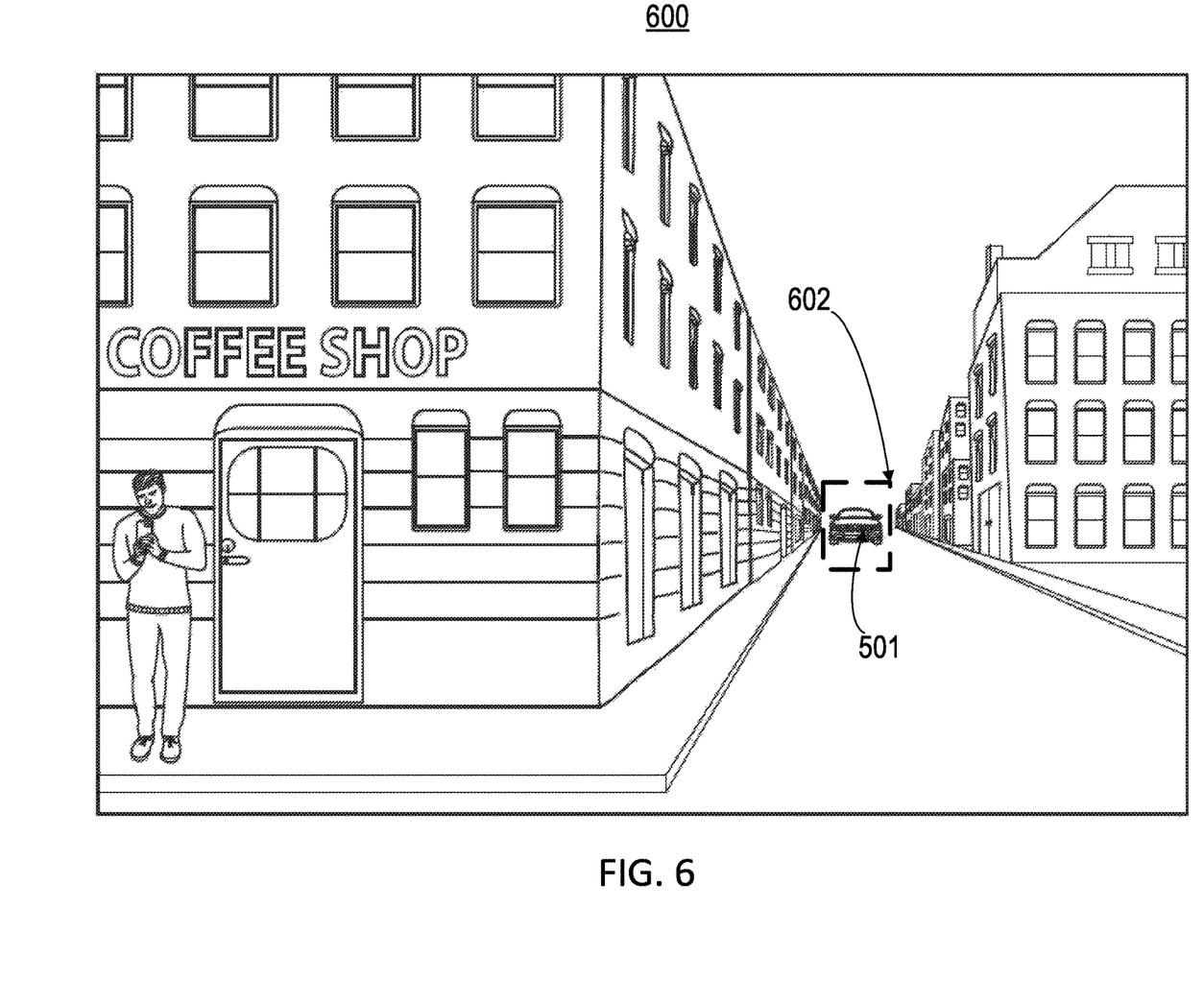

FIG. 5-FIG. 6 illustrate an example of a bounding box placement method that uses image object centroid information, according to some aspects of the disclosed technology.

FIG. 5 illustrates an example image 500 containing an image object 501, and in which a centroid input is received, e.g., via a user input provided by cursor 502. The image 500 containing image object 501 and the centroid input are provided to a bounding box processing system containing a machine-learning model, such as system 100 discussed above. In such approaches, the machine-learning model processes image 500 together with the centroid input to generate/output a bounding box prediction, as shown in FIG. 6.

Specifically, FIG. 6 illustrates a processed image 600 wherein image object is bounded by bounding box 602. In some aspects, estimations of bounding box location and bounding box dimensions can be improved with use of the additional information provided by the centroid input.

Figure 7:
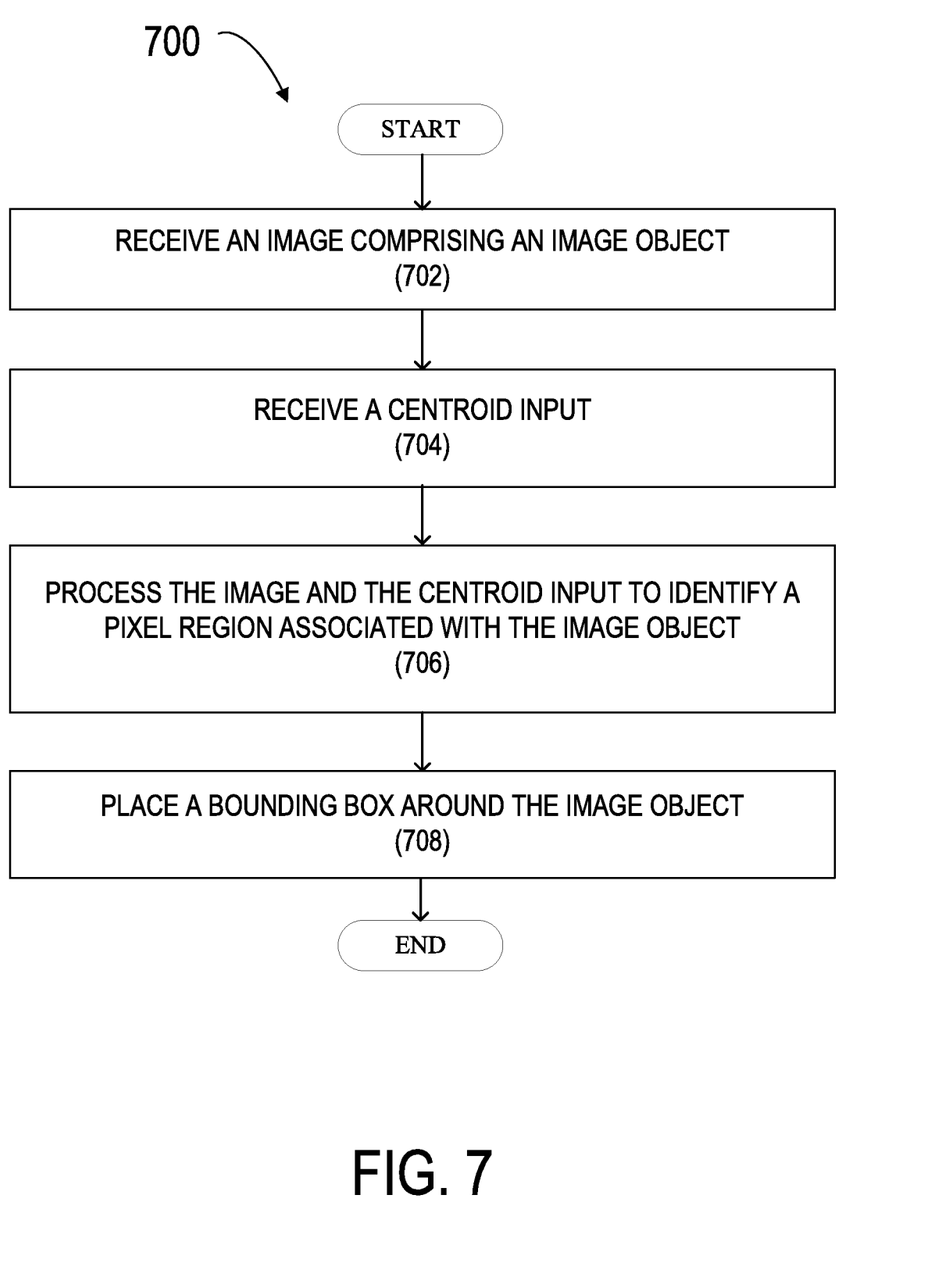
FIG. 7 illustrates an example process for generating bounding box suggestions based on user provided image object centroid inputs, according to some aspects of the disclosed technology.

FIG. 7 illustrates an example process 700 for generating bounding box suggestions based on user provided centroid inputs, according to some aspects of the disclosed technology. Process 700 begins with step 702 in which an image is received (e.g., by a machine learning system) that includes at least one image object. Image objects can be any objects in the image frame for which bounding may be desired, including but not limited to: automobiles, motorcycles, crosswalks, people, road signs, traffic lights, and/or buildings, etc.

In step 704, a centroid input is received by the machine-learning system. The centroid input can include an indication of a center (or approximate center) of an image object for which bounding is to be performed. In some approaches, the centroid input is generated by a user and communicated to the machine-learning system via an input device, such as a keyboard, mouse pointer or other input device. By way of example, a user may position a cursor over a pixel area at (or approximate to) the center of the image object, and can indicate the center point (centroid) with a mouse click. Graphical example relating to the user identification of image object centroid locations are discussed with respect to FIGS. 5-6, above.

In step 706, the image and centroid input are processed to identify a pixel region associated with the image object. The associated pixel region indicates an image region around which a bounding box is to be inserted in the associated image.

In step 708, a bounding box is placed around the image object. In some aspects, the bounding box encloses the entire pixel region identified in step 706. As discussed above, bounding box insertion, including sizing and placement, can be improved using the centroid input indication received at step 704. In this manner, bounding box placement, and the entire bounding box insertion workflow can be improved.

In some aspects, bounding box placement in subsequent image frames can be based on bounding box placement in one or more image priors. Further to the above examples of FIGS. 2-7, once an image object is bounded by a bounding box (e.g., bounding box 302 or 602), additional bounding boxes can be placed around the object in one or more subsequent frames. Placement of bounding boxes in the subsequent frames can be performed irrespective of location changes of the object in those subsequent frames. That is, image object placement for subsequent frames can be based on bounding box placement and confirmation in an earlier frame. By automatically performing subsequent bounding box insertions/placements, bounding box insertions can be efficiently performed over multiple image frames, for example, to improve bounding box processing of video segments with some image object continuity.

Figure 8:
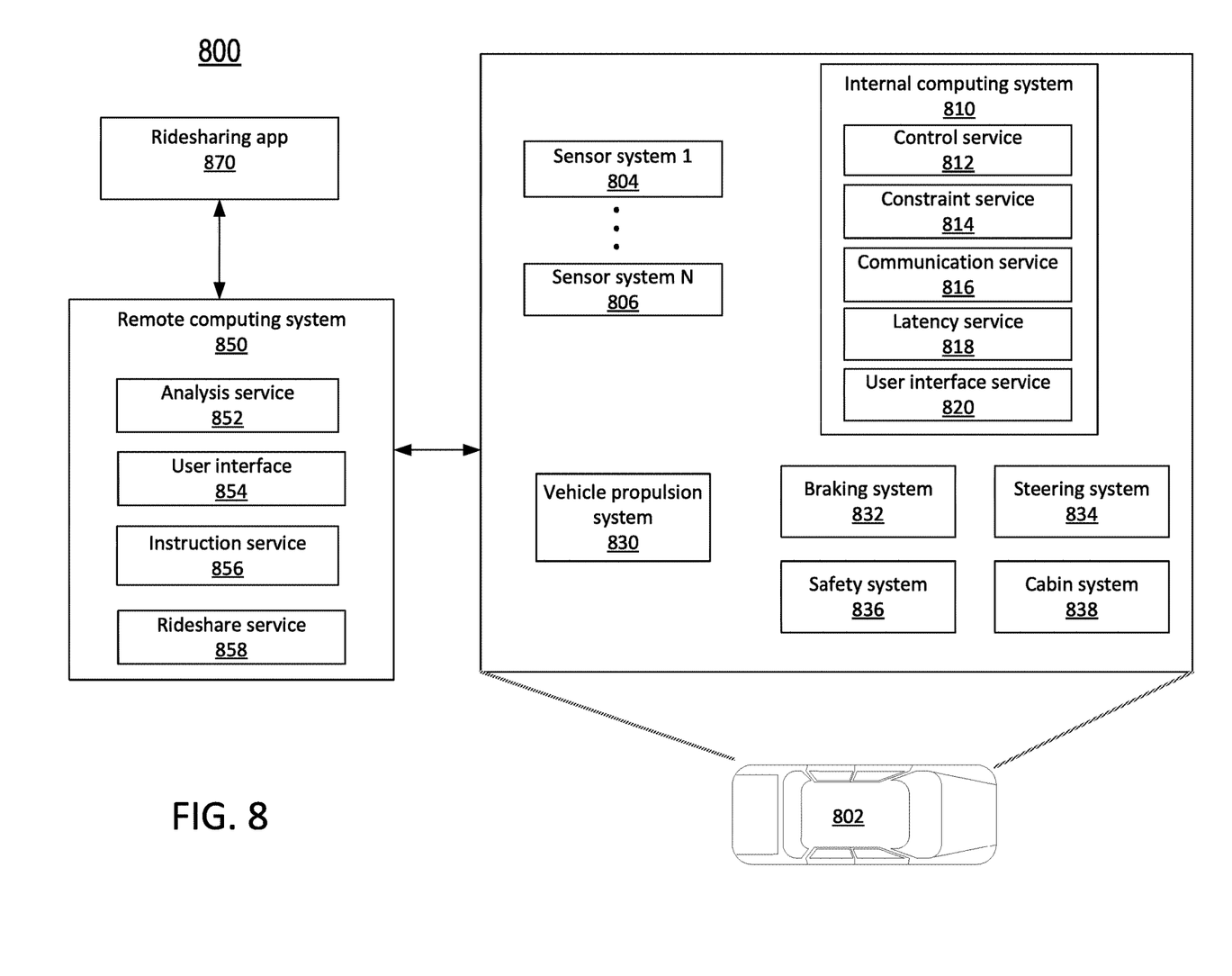
FIG. 8 illustrates an example environment that includes an autonomous vehicle in communication with a remote computing system, according to some aspects of the disclosed technology.

FIG. 8 illustrates environment 800 that includes an autonomous vehicle (AV) 802 in communication with a remote computing system 850. Autonomous vehicle 802 can navigate about roadways without a human driver based upon sensor signals output by sensor systems 804-806 of the autonomous vehicle 802. The autonomous vehicle 802 includes a plurality of sensor systems 804-806 (a first sensor system 804 through an Nth sensor system 806). The sensor systems 804-806 are of different types and are arranged about the autonomous vehicle 802. For example, the first sensor system 804 may be a camera sensor system, and the Nth sensor system 806 may be a LiDAR sensor system. Other exemplary sensor systems include radar sensor systems, global positioning system (GPS) sensor systems, inertial measurement units (IMU), infrared sensor systems, laser sensor systems, sonar sensor systems, and the like.

Autonomous vehicle 802 further includes several mechanical systems that are used to effectuate appropriate motion of the autonomous vehicle 802. For instance, the mechanical systems can include but are not limited to, a vehicle propulsion system 830, a braking system 832, and a steering system 834. Vehicle propulsion system 830 may include an electric motor, an internal combustion engine, or both. The braking system 832 can include an engine brake, brake pads, actuators, and/or any other suitable componentry that is configured to assist in decelerating the autonomous vehicle 802. The steering system 834 includes suitable componentry that is configured to control the direction of movement of the autonomous vehicle 802 during navigation.

Autonomous vehicle 802 further includes a safety system 836 that can include various lights and signal indicators, parking brake, airbags, etc. Autonomous vehicle 802 further includes a cabin system 838 that can include cabin temperature control systems, in-cabin entertainment systems, etc.

Autonomous vehicle 802 additionally comprises an internal computing system 810 that is in communication with the sensor systems 804-806 and the systems 830, 832, 834, 836, and 838. The internal computing system includes at least one processor and at least one memory having computer-executable instructions that are executed by the processor. The computer-executable instructions can make up one or more services responsible for controlling the autonomous vehicle 802, communicating with remote computing system 850, receiving inputs from passengers or human co-pilots, logging metrics regarding data collected by sensor systems 804-806 and human co-pilots, etc.

The internal computing system 810 can include a control service 812 that is configured to control the operation of the vehicle propulsion system 830, the braking system 832, the steering system 834, the safety system 836, and the cabin system 838. The control service 812 receives sensor signals from the sensor systems 804-806 as well communicates with other services of the internal computing system 810 to effectuate operation of the autonomous vehicle 802. In some embodiments, control service 812 may carry out operations in concert one or more other systems of autonomous vehicle 802.

The internal computing system 810 can also include a constraint service 814 to facilitate safe propulsion of the autonomous vehicle 802. The constraint service 814 includes instructions for activating a constraint based on a rule-based restriction upon operation of the autonomous vehicle 802. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 812.

The internal computing system 810 can also include a communication service 816. The communication service can include both software and hardware elements for transmitting and receiving signals from/to the remote computing system 850. Communication service 816 is configured to transmit information wirelessly over a network, for example, through an antenna array that provides connectivity using one or more cellular transmission standards, such as long-term evolution (LTE), 3G, 5G, or the like.

In some embodiments, one or more services of the internal computing system 810 are configured to send and receive communications to remote computing system 850 for such reasons as reporting data for training and evaluating machine learning algorithms, requesting assistance from remoting computing system or a human operator via remote computing system 850, software service updates, rideshar-ing pickup and drop off instructions etc.

The internal computing system 810 can also include a latency service 818. The latency service 818 can utilize timestamps on communications to and from the remote computing system 850 to determine if a communication has been received from the remote computing system 850 in time to be useful. For example, when a service of the internal computing system 810 requests feedback from remote computing system 850 on a time-sensitive process, the latency service 818 can determine if a response was timely received from remote computing system 850 as information can quickly become too stale to be actionable. When the latency service 818 determines that a response has not been received within a threshold, the latency service 818 can enable other systems of autonomous vehicle 802 or a passenger to make necessary decisions or to provide the needed feedback.

The internal computing system 880 can also include a user interface service 820 that can communicate with cabin system 838 in order to provide information or receive information to a human co-pilot or human passenger. In some embodiments, a human co-pilot or human passenger may be required to evaluate and override a constraint from constraint service 814, or the human co-pilot or human passenger may wish to provide an instruction to the autonomous vehicle 802 regarding destinations, requested routes, or other requested operations.

As described above, the remote computing system 850 is configured to send/receive a signal from the autonomous vehicle 802 regarding reporting data for training and evaluating machine learning algorithms, requesting assistance from remote computing system 850 or a human operator via the remote computing system 850, software service updates, rideshare pickup and drop off instructions, etc.

The remote computing system 850 includes an analysis service 852 that is configured to receive data from autonomous vehicle 802 and analyze the data to train or evaluate machine learning algorithms for operating the autonomous vehicle 802. The analysis service 852 can also perform analysis pertaining to data associated with one or more errors or constraints reported by autonomous vehicle 802.

The remote computing system 850 can also include a user interface service 854 configured to present metrics, video, pictures, sounds reported from the autonomous vehicle 802 to an operator of remote computing system 850. User interface service 854 can further receive input instructions from an operator that can be sent to the autonomous vehicle 802.

Remote computing system 850 can also include an instruction service 856 for sending instructions regarding the operation of the autonomous vehicle 802. For example, in response to an output of analysis service 852 and/or user interface service 854, instructions service 856 can prepare instructions to one or more services of the autonomous vehicle 802 or a co-pilot or passenger of AV 802.

The remote computing system 850 can also include a rideshare service 858 configured to interact with ridesharing application 870 operating on (potential) passenger computing devices. The rideshare service 858 can receive requests to be picked up or dropped off from passenger ridesharing app 870 and can dispatch autonomous vehicle 802 for the trip. Rideshare service 858 can also act as an intermediary between ridesharing app 870 and the AV wherein a passenger might provide instructions to the autonomous vehicle 802 to go around an obstacle, change routes, and/or honk a horn, etc.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 9:
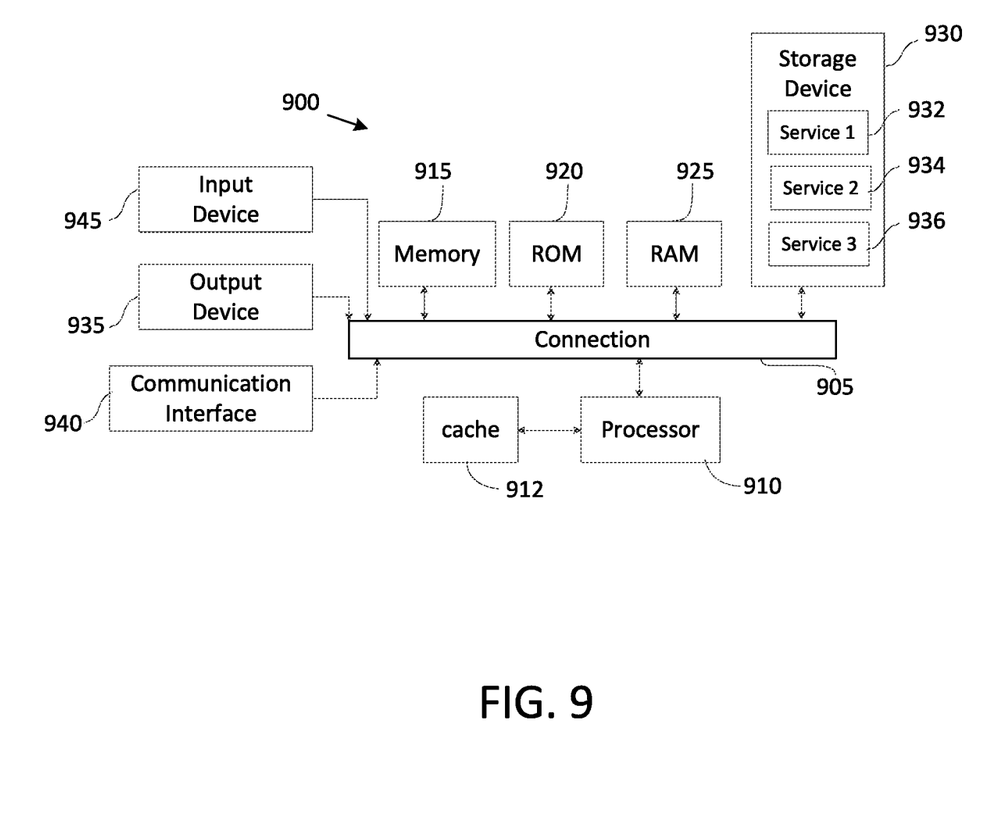
FIG. 9 illustrates an example processor-based system with which some aspects of the subject technology can be implemented.

FIG. 9 shows an example of computing system 900, which can be for example any computing device making up internal computing system 810, remote computing system 850, (potential) passenger device executing rideshare app 870, or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that connects various system components including system memory 915, such as read-only memory (ROM) 920 and random-access memory (RAM) 925 to processor 910. Computing system 900 can include a cache of high-speed memory 912 connected directly with, in close proximity to, or integrated as part of processor 910.

Processor 910 can include any processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement, and therefore the basic features here may easily be substituted for improved hardware or firmware arrangements as they are developed.

Storage device 930 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A computer-implemented method for performing image-object detection, comprising:
   receiving, from a first data set, an image comprising a first image object;
   processing the image to identify a pixel region associated with the first image object;
   placing a first bounding box around the first image object based on the identified pixel region;
   receiving a user input comprising an indication of whether the first bounding box is accurately placed around the first image object, wherein the user input indicates a centroid location of the pixel region associated with the first image object;
   automatically resizing the first bounding box based on the user input; and
   automatically identifying one or more semantic labels that are associated with the first image object.

2. The computer-implemented method of claim 1, wherein the indication provided by the user input is configured to verify an accurate location of the first bounding box.

3. The computer-implemented method of claim 1, wherein the indication provided by the user input is configured to verify an accurate size of the first bounding box.

4. The computer-implemented method of claim 1, wherein the indication provided by the user input is configured to verify an inaccurate placement of the bounding box around the first image object, and
   wherein the user input is further configured to modify placement of the first bounding box to produce an accurate placement of the first bounding box around the first image object.

5. The computer-implemented method of claim 1, further comprising:
   processing the image to identify a pixel region associated with a second image object;
   placing a second bounding box around the second image object; and
   receiving a user second input comprising an indication of whether the second bounding box is accurately placed around the second image object.

6. The computer-implemented method of claim 1, wherein processing the image to identify the pixel region associated with the first image object further comprises:
   providing the image to a machine-learning classifier; and
   receiving an indication of the pixel region associated with the first image object from the machine learning classifier.

7. A system for performing image-object detection comprising:
   one or more processors; and a computer-readable medium comprising instructions stored therein, which when executed by the processors, cause the processors to perform operations comprising:

receiving, from a first data set, an image comprising a first image object;

processing the image to identify a pixel region associated with the first image object;

placing a first bounding box around the first image object based on the identified pixel region;

receiving a user input comprising an indication of whether the first bounding box is accurately placed around the first image object, wherein the user input indicates a centroid location of the pixel region associated with the first image object;

automatically resizing the first bounding box based on the user input; and automatically identifying one or more semantic labels that are associated with the first image object.

8. The system of claim 7, wherein the indication provided by the user input is configured to verify an accurate location of the first bounding box.

9. The system of claim 7, wherein the indication provided by the user input is configured to verify an accurate size of the first bounding box.

10. The system of claim 7, wherein the indication provided by the user input is configured to verify an inaccurate placement of the bounding box around the first image object, and wherein the user input is further configured to modify placement of the first bounding box to produce an accurate placement of the first bounding box around the first image object.

11. The system of claim 7, wherein the processors are further configured to perform operations comprising:

processing the image to identify a pixel region associated with a second image object;

placing a second bounding box around the second image object; and receiving a user second input comprising an indication of whether the second bounding box is accurately placed around the second image object.

12. The system of claim 7, wherein processing the image to identify the pixel region associated with the first image object further comprises:

providing the image to a machine-learning classifier; and receiving an indication of the pixel region associated with the first image object from the machine learning classifier.

13. A non-transitory computer-readable storage medium comprising instructions stored therein, which when executed by one or more processors, cause the processors to perform operations comprising:

receiving, from a first data set, an image comprising a first image object;

processing the image to identify a pixel region associated with the first image object;

placing a first bounding box around the first image object based on the identified pixel region;

receiving a user input comprising an indication of whether the first bounding box is accurately placed around the first image object, wherein the user input indicates a centroid location of the pixel region associated with the first image object;

automatically resizing the first bounding box based on the user input; and automatically identifying one or more semantic labels that are associated with the image object.

14. The non-transitory computer-readable storage medium of claim 13, wherein the indication provided by the user input is configured to verify an accurate location of the first bounding box.

15. The non-transitory computer-readable storage medium of claim 13, wherein the indication provided by the user input is configured to verify an accurate size of the first bounding box.

16. The non-transitory computer-readable storage medium of claim 13, wherein the indication provided by the user input is configured to verify an inaccurate placement of the bounding box around the first image object, and wherein the user input is further configured to modify placement of the first bounding box to produce an accurate placement of the first bounding box around the first image object.

17. The non-transitory computer-readable storage medium of claim 13, wherein the processors are further configured to perform operations comprising:

processing the image to identify a pixel region associated with a second image object;

placing a second bounding box around the second image object; and receiving a user second input comprising an indication of whether the second bounding box is accurately placed around the second image object.

18. The non-transitory computer-readable storage medium of claim 13, wherein processing the image to identify the pixel region associated with the first image object further comprises:

providing the image to a machine-learning classifier; and receiving an indication of the pixel region associated with the first image object from the machine learning classifier.

* * * * *